Sept. 18, 1934.   J. W. CASE   1,974,298
METHOD OF MAKING A SEAL FOR ELECTRIC DISCHARGE DEVICES
Original Filed Dec. 28, 1929
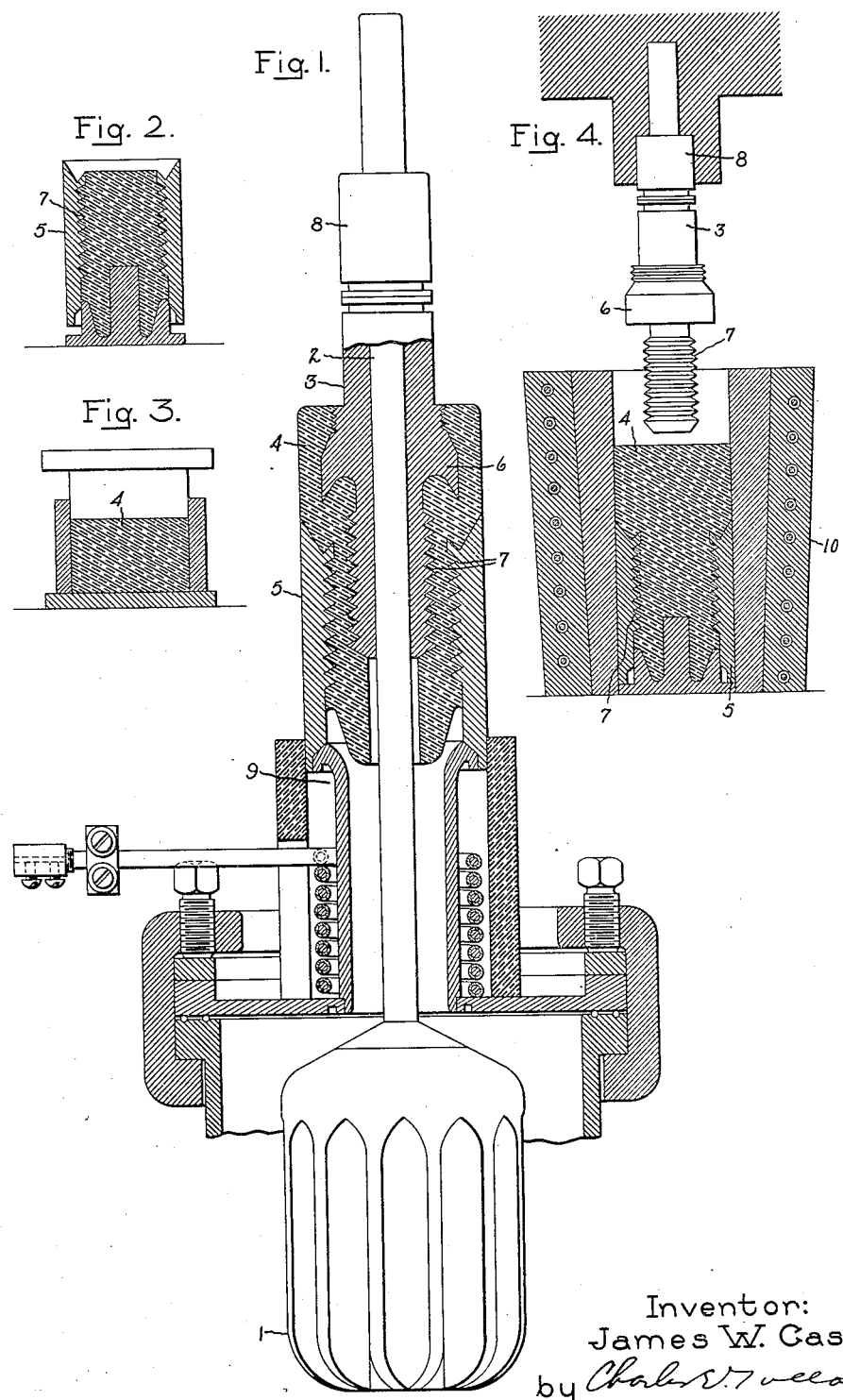
Inventor:
James W. Case,
by *Charles V. Tuella*
His Attorney.

Patented Sept. 18, 1934

1,974,298

UNITED STATES PATENT OFFICE 1,974,298

METHOD OF MAKING A SEAL FOR ELECTRIC DISCHARGE DEVICES

James W. Case, Schenectady, N. Y., assignor to General Electric Company, a corporation of New York Original application December 28, 1929, Serial No. 417,239. Divided and this application May 5, 1932, Serial No. 609,454

2 Claims. (Cl. 49—81)

This application is a division of my application, Serial No. 417,239, filed December 28, 1929.

My invention relates to gas impervious seals and has for its principal object the provision of an improved seal for electric discharge devices such as mercury arc rectifiers.

One of the most difficult problems encountered in the development of high capacity mercury arc rectifiers is the construction of a simple and rugged seal which may be completely assembled in the factory, will withstand the necessarily rough usage to which it is exposed during installation and will remain gas-tight under repeated variations in temperature. Various attempts along this line have been made, but the seals produced have not been altogether satisfactory for the reason that they tend to develop leaks and produce unsatisfactory operation of the apparatus.

In accordance with my invention, a vitreous compound composed of a suitable mixture of mica and lead borate and capable of tenaciously adhering to the surfaces of the metal parts of the seal is forced in between these parts under predetermined conditions hereinafter set forth.

My invention will be better understood from the following description when considered in connection with the accompanying drawing, and its scope will be pointed out in the appended claims.

Referring to the drawing, Fig. 1 illustrates, in cross section, a seal made in accordance with my invention; and Figs. 2 to 4 illustrate different steps in the construction of the seal.

This seal includes a metal core or insert 3 and a metal sleeve 5 between which is interposed a vitreous compound 4. The metal core 3 is suitably machined at the top for the attachment preferably by welding of a metal terminal 8 into which is screwed a metal rod 2 arranged to support and conduct current to an electrode 1. The sleeve 5 is machined for the attachment of a sleeve 9 by which the seal is connected to the rectifier casing of the device.

The vitreous compound 4 is composed of a mixture of approximately 50% ground mica and approximately 50% lead borate. In forming the compound, the lead borate and finely ground mica are heated in an oven for a short time to drive off the excess oxygen contained in the lead borate ingredients. A very small amount of water is then added so that the powder may be pressed together in a cold state. A suitable amount of this powder is then forced into the sleeve 5 (see Fig. 2) and into a cylindrical mold (see Fig. 3). The sleeve 5 and mold are then heated in an oven to a temperature at which the compound becomes plastic. At the same time, the core 3 is heated to a temperature of approximately 75° C. above that of the other parts of the seal. After the various parts have been brought to the proper temperature, the sleeve containing the heated material is placed in an electrically heated mold 10 (see Fig. 4) which is at a temperature substantially 200° below that of the oven in which the sleeve is heated. The cylindrical body 4 of the vitreous compound is then placed on the top of the sleeve 5 so that it will form the top of the insulation body interposed between the shell and the core. The core is then removed from the oven and pressed down into the plastic material until it comes to rest in the position illustrated in Fig. 1 of the drawing. The whole seal is then held in the mold at a high pressure for substantially one-half hour during which the mold is allowed to cool.

It has been found that this method of procedure gives the vitreous compound a permanent set and causes it to thoroughly wet all the surfaces of the metal core and sleeve so that a tight seal is formed. In order to reduce the liability of leaks at the metal surfaces, the core 3 and sleeve 5 are serrated, thus increasing the length of the leakage surface. As will be readily understood, the flange 6 serves both to increase the leakage surface and to compress the vitreous compound into the space between the sleeve and the core.

It has been found that in order to successfully form a seal of this character, the absence of oxide on the metal parts is necessary. Due to the fact that the inner surface of the sleeve is covered with the vitreous compound while being heated, no oxide is formed on this surface. The metal core 3, however, is heated without a protective covering and is preferably made of a non-oxidizing metal which has a coefficient of expansion so related to the coefficient of expansion of the vitreous compound and of the metal sleeve as to avoid the production of strain between the different parts of the seal.

In selecting the metals of the seal, it is, therefore, necessary to take into consideration the temperatures to which the different parts of the seal are subjected during its operation.

It has been found that with a sleeve made of mild steel and a core made of an iron alloy containing about 25% chromium, the relative movement between the vitreous compound and the core and sleeve is reduced to a minimum under the usual operating conditions of mercury arc rectifiers.

What I claim as new and desire to secure by Letters Patent of the United States is:

1. The method of making a gas-tight seal which includes, forming a cold plastic compound of mica and lead borate capable after exposure to heat and pressure of adhering tenaciously to metal surfaces in the substantial absence of oxide on said metal surfaces, forming a shell of metal which is non-oxidized but subject to oxidation if heated in contact with air to the softening temperature of said compound, forcing a filling of said cold plastic compound into said shell under pressure to prevent contact of air with the surfaces of the shell in contact with said compound, forming a core of a metal which is non-oxidizing when heated in air to a temperature in excess of the softening temperature of said compound, heating said shell and the filling of compound therein to the softening temperature of said compound, heating said core to a temperature in excess of the softening temperature of the compound, and forcing the heated core into the filling of compound.

2. The method of making a gas-tight seal which includes, forming a cold plastic compound of mica and lead borate capable after exposure to heat and pressure of adhering tenaciously to metal surfaces in the substantial absence of oxide on said metal surfaces, forming a shell of metal the inner surface of which is non-oxidized but subject to oxidation if heated in contact with air to the softening temperature of said compound, forcing a filling of said cold plastic compound under pressure into said shell to prevent contact of air with said non-oxidized inner surface of the shell, forming a core of a metal which is non-oxidizing when heated in air to a temperature in excess of the softening temperature of said compound, heating said core and the filling of compound therein to the softening temperature of said compound, heating said core to a temperature in excess of the softening temperature of the compound, forcing the heated core into the filling of compound, and gradually cooling said seal while said compound is subjected to pressure.

JAMES W. CASE.